(12) United States Patent
Bohn

(10) Patent No.: US 6,229,297 B1
(45) Date of Patent: May 8, 2001

(54) DEVICE FOR DETERMINING THE POSITION OF AN OBJECT RELATIVE TO A SURFACE

(75) Inventor: David D. Bohn, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/345,188

(22) Filed: Jun. 30, 1999

(51) Int. Cl.[7] ...................................................... G01P 3/48
(52) U.S. Cl. ........................... 324/160; 33/501.02; 33/503
(58) Field of Search .............................. 33/533, 545, 546, 33/549, 551, 552, 553, 554, 555, 501.02, 501.03, 501.04; 73/597, 619; 324/178, 160

(56) References Cited

U.S. PATENT DOCUMENTS

| | | | |
|---|---|---|---|
| 2,607,127 | * | 8/1952 | Wagenhals ........................ 33/501.02 |
| 3,056,209 | * | 10/1962 | Oliver ..................................... 33/174 |
| 3,190,261 | * | 6/1965 | Ziffer ................................. 33/501.02 |
| 3,665,608 | * | 5/1972 | Stockebrand ......................... 33/1 M |
| 3,751,812 | * | 8/1973 | Meyer ..................................... 33/555 |
| 3,790,261 | * | 2/1974 | Threlkeld ............................... 352/72 |
| 4,169,317 | * | 10/1979 | Bone ................................. 33/501.04 |
| 4,731,934 | * | 3/1988 | Barnaby et al. ........................ 33/504 |
| 4,903,413 | * | 2/1990 | Bellwood ............................... 33/551 |
| 5,054,205 | * | 10/1991 | Danielli ............................... 33/555.1 |
| 5,307,676 | * | 5/1994 | Gutman ................................. 73/162 |
| 5,404,649 | * | 4/1995 | Hajdukiewicz et al. ............... 33/503 |
| 5,535,149 | * | 7/1996 | Mori et al. ............................ 708/322 |
| 5,575,078 | * | 11/1996 | Moulton, III ........................... 33/815 |
| 5,652,659 | * | 7/1997 | Bornhorst, Jr. et al. ............. 358/299 |
| 5,818,605 | | 10/1998 | Crewe et al. ......................... 358/299 |
| 5,877,623 | * | 3/1999 | Min ..................................... 324/160 |
| 5,979,070 | * | 11/1999 | Lau ....................................... 33/559 |
| 6,003,232 | * | 12/1999 | Lopez Gomez et al. .............. 33/203 |
| 6,044,569 | * | 4/2000 | Ogihara et al. ........................ 33/503 |
| 6,137,287 | * | 3/1999 | Ichihashi ............................. 324/160 |

* cited by examiner

Primary Examiner—Diego Gutierrez
Assistant Examiner—Maria Fernandez

(57) ABSTRACT

A position sensing device is disclosed wherein the positioning sensing device may determine the velocity and position of an object relative to a surface as the object is moved relative to the surface. The positioning sensing device may comprise two depth measurement devices that are mounted to the object on an axis that is substantially parallel to the direction of movement between object and the surface. The depth measurement devices are spaced a predetermined distance from each other. The depth measurement devices measure the contours of the surface as the object is moved relative to the surface and may output data representative of the surface contour to a processor. Accordingly, the processor receives two data signals that are out of phase wherein the phase shift is proportional to the relative velocity between the object and the surface. The processor may then perform an analysis on the data signals to determine the velocity of the object relative to the surface. Likewise, the processor may also determine the displacement of the object relative to the surface during a time interval.

20 Claims, 5 Drawing Sheets

DEVICE FOR DETERMINING THE POSITION OF AN OBJECT RELATIVE TO A SURFACE

TECHNICAL FIELD OF THE INVENTION

The present invention relates to a-position sensing device and, more particularly, to a device for determining the position of a scanner relative to the surface of an object being scanned.

BACKGROUND OF THE INVENTION

Position sensors are used in various applications to determine the position of objects relative to surfaces. For example, some scanning devices (sometimes referred to herein simply as scanners) use position sensors to determine the position of the scanner relative to a document that is being scanned. In another example, some printers use position sensors to determine the position of paper being printed on relative to the device within the printer that actually prints on the paper, e.g., a print carriage.

A scanner is a device that converts an image of an object, e.g., a page of text, to machine-readable image data (sometimes referred to herein simply as image data), referred to herein simply as image data. Some scanners convert a narrow scan line portion of the image of the object to image data. In order to generate image data representative of the image of the entire object, the scanner is moved relative to the object. As the scanner is moved relative to the object, the scanner generates image data representative of a cumulation of sequential scan line portions of the image of the object. The image of the object is, thus, represented as this cumulation of sequential scan line portions of the object, similar to a video display of the object.

The image data is typically processed by, and stored in, a computer, which may be used to replicate or modify the image of the object. For example, the image data may be transmitted via a data line to another computer or facsimile machine, that replicates the image of the object. In the case where the object is a page of text, the image of the text may be input into the computer and edited by a word processing program.

It is critical that the computer knows where, in relation to the surface of the object, the scan lines were generated in order to properly process the image data. Determining the positions on the object from where scan lines were generated may be achieved by determining the position or velocity of the scanner relative to the object as the image data is being generated. The image data representing the scan lines may be electronically tagged with the locations of the scan lines relative to the surface or relative to each other. During processing, the computer may then properly place the scan lines relative to each other to replicate the image of the object.

The locations of the scan lines relative to the surface of the object are used by the computer to replicate the image of the object. One aspect to replicating the image of the object is determining the size of the object in the dimension defined by the movement of the scanner relative to the surface of the object. For example, if the scanner is generating 1000 scan lines per second and the relative velocity between the scanner and the object is established at one inch per second, the computer will process the image data based on each scan line representing one one-thousandth of an inch of the image of the object. If, however, the relative velocity decreases and the decreased velocity is not accurately conveyed to the computer, the computer will continue to process the image data as though each scan line represents one one-thousandth of an inch of the image of the object. This will result in the image of the object represented by the image data being compressed, which is not an accurate representation of the object. If, on the other hand, the relative velocity is increased and the increased velocity is not accurately conveyed to the computer, the image of the object represented by the image data will represent an expanded image of the object, which is also not accurate.

Some scanners use roller mechanisms to generate information pertaining to the position of the scanner relative to the surface of the object being scanned. This position information is processed to determine where, in relation to the surface of the object, the scan lines were generated. The roller mechanism contacts the object and rotates as the scanner is moved relative to the object. The scanner measures the rotation of the roller mechanism to determine the position of the scanner relative to the object. Roller mechanisms, however, do not provide a direct measurement of the position of the scanner relative to the object. Instead, the position measurement is derived from the rotation of the roller mechanism, which may add inaccuracies to the position measurement. Furthermore, the roller mechanism relies on friction between the roller mechanism and the object in order to maintain rotation. If the friction is decreased for any reason, the roller mechanism may slip rather than rotate, which will cause the position measurement and, accordingly, the image represented by the image data, to be inaccurate.

Other scanners use optics to determine the position of the scanner relative to the object. As an example, optical detectors attached to the scanner continually image small two-dimensional areas of the object and transmit image data representative of these areas to a computer. The computer identifies distinct features of the object that are located in these imaged areas and stores the locations of these distinct features relative to the optical detectors. These distinct features may, as an example, be variations in the surface of paper caused by pulp material used in the manufacture of paper. As the scanner is moved relative to the object, these distinct features move relative to the optical detectors. The computer identifies the direction and amount of movement of these distinct features relative to the optical detectors to determine the position, direction of movement, and velocity of the scanner relative to the object.

Scanners using these optical detectors, however, require extensive processing capabilities in order to identify distinct features on the object and to determine the movement of the distinct features relative to the optical detectors. These extensive processing capabilities increase the cost and complexity of the scanner. Another problem with these optical detectors is that the areas on the object that they image are required to be illuminated in order to detect distinct features on the object. This addition illumination increases the power requirement of the scanner beyond the requirements typically required to scan the object. This additional power requirement is inherently detrimental to hand-held scanners that rely on portable power supplies. Furthermore, the optical detectors require additional optical components, e.g., lenses, to be used in the scanner, which increases the cost and complexity of the scanner.

Therefore, a need exists for a position sensor that will directly and accurately measure the position or velocity of a first object relative to a surface of a second object and that requires minimal power and processing requirements.

SUMMARY OF THE INVENTION

A position sensing device is disclosed wherein the positioning sensing device may determine the velocity and position of an object relative to a surface as the object is moved relative to the surface. The positioning sensing device may comprise two depth measurement devices (often referred to as profilometers) that are mounted to the object on an axis that is substantially parallel to the direction of movement between the object and the surface. The depth measurement devices are spaced a predetermined distance from each other. The depth measurement devices measure the contours of the surface as the object is moved relative to the surface and may output data representative of the surface contour to a processor. Accordingly, the processor receives two data signals that are out of phase wherein the phase shift is proportional to the relative velocity between the object and the surface. The processor may then perform an analysis on the data signals to determine the velocity of the object relative to the surface. Likewise, the processor may also determine the displacement of the object relative to the surface during a time interval.

DETAILED DESCRIPTION OF THE INVENTION

Figure 1:
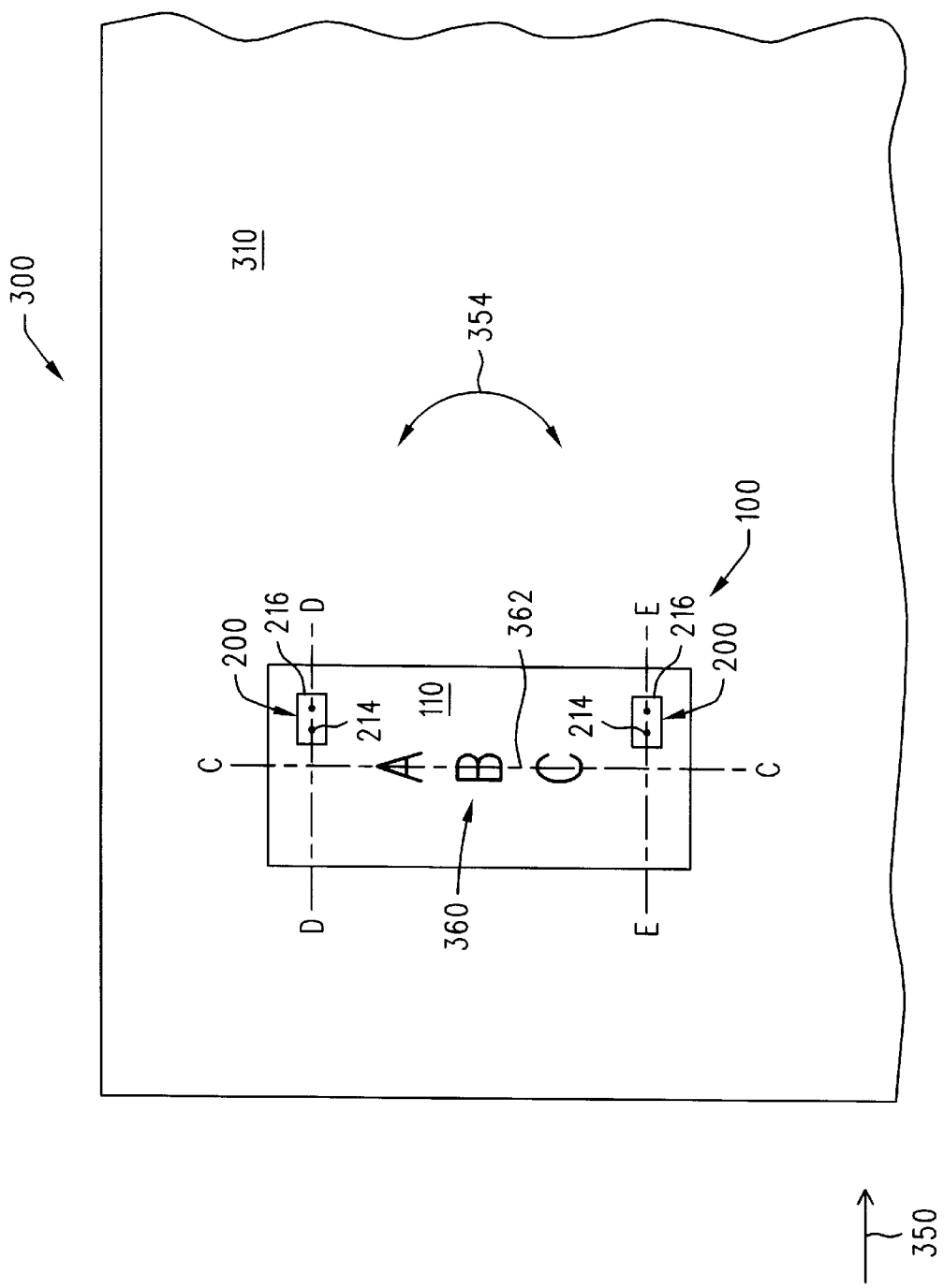
FIG. 1 is a top, cut away schematic illustration of a scanner associated with a document.

FIGS. 1 through 6, in general, illustrate a position sensing device 200 for determining the position of an object 100 relative to a first axis 350 wherein the first axis 350 is located on a surface 310. The position sensing device 200 comprises: a first profilometer 210 attached to the object 100; a second profilometer 204 attached to the object 100 at a predetermined distance 236 from the first profilometer 210; wherein the first profilometer 210 and the second profilometer 204 are located along a second axis; and wherein the first axis 350 is substantially parallel to the second axis.

FIGS. 1 through 6 also, in general, illustrate a position sensing device 200 for determining the position of an object 100 relative to a first axis 350 wherein the first axis 350 is located on a surface 310. The position sensing device 200 comprises: a first transducer 250 operationally associated with a first stylus 252 attached to the object 100; a second transducer 206 operationally associated with a second stylus 212 attached to the object 100 wherein the first stylus 252 is located a predetermined distance 236 from the second stylus 212; wherein the first stylus 252 and the second stylus 212 are located along a second axis; and wherein the first axis 350 is substantially parallel to the second axis.

FIGS. 1 through 6 also, in general, illustrate a position sensing device 200 for determining the position of an object 100 relative to a first axis 350 wherein the first axis 350 is located on a surface 310. The position sensing device 200 comprises: a first optical profilometer attached to the object 100; a second optical profilometer attached to the object 100 wherein the first optical profilometer is located a predetermined distance from the second optical profilometer; wherein the first optical profilometer and the second optical profilometer are located along a second axis; and wherein the first axis 350 is substantially parallel to the second axis.

FIGS. 1 through 6 also, in general, illustrate a method of determining the velocity of an object 100 relative to a first axis 350 wherein the first axis 350 is located on a surface 310. The method comprises: providing a first depth measurement device 210 affixed to the object 100; providing a second depth measurement device 204 affixed to the object 100, the second depth measurement device 204 being spaced a predetermined distance 236 along a second axis from the first depth measurement device 210, the first axis 350 being substantially parallel to the second axis; causing relative movement between the object 100 and the surface 310 along the first axis 350; measuring the depth of the surface 310 with the first depth measurement device 210 and the second depth measurement device 204; performing an analysis on the depth of the surface 310 measured by the first depth measurement device 210 and the second depth measurement device 204 to determine the velocity of the object 100 relative to the surface 310.

Having described the position sensor 200 in general, it will now be summarily described. A more detailed description of an imaging device 100 incorporating the position sensor 200 follows this summary description. The imaging device 100 is sometimes referred to herein simply as a scanner. It is to be understood that following description the position sensor 200 incorporated into the scanner 100 is for illustration purposes only and that the position sensor 200 may be used in other devices to determine the position of an object relative to a surface.

FIG. 1 illustrates a cut away top view of the scanner 100 scanning the surface 310 of a sheet of paper 300, wherein the surface 310 has text 360 printed on it. Specifically, FIG. 1 illustrates the footprint of the scanner 100 and the locations of two position sensors 200 within the scanner 100. The scanner 100 generates machine-readable image data (sometimes referred to herein simply as image data) of an object, which, in FIG. 1 is the surface 310 of the sheet of paper 300. Generating image data representative of an image of an object is sometimes referred to as "imaging" or "scanning" the object. The scanner 100 described herein is a hand-held type scanner wherein a user causes relative movement between the scanner 100 and the surface of the object as the object is being scanned.

The scanner 100 may generate image data representing a narrow scan line portion 362 of the surface 310. The scan line portion 362 may be located in a fixed position relative to the scanner 100 and is aligned along the reference line CC in FIG. 1. The scanner 100 is illustrated in FIG. 1 as being moved in a direction 350 relative to the surface 310 as the image data is being generated. The direction 350 is generally perpendicular to the scan line portion 362. As the scanner 100 is moved, the scanner 100 periodically generates image data representative of the image of the scan line portions 362 of the surface 310. The image data representing these scan line portions 362 is stored by the scanner 100 in a conventional data storage device. After the scanner 100 has been moved over the surface 310, the scanner 100 will have generated image data representing a plurality of scan line portions 362 of the surface 310 and stored the image data in the data storage device.

In order to properly replicate the image of the surface 310, the scanner 100 must arrange these scan line portions represented by the image data so that the image data replicates the image of the surface 310. Accordingly, the scanner 100 must know from where, relative to the surface 310, the scan line portions 362 of the surface 310 were generated.

Determining the locations of the scan line portions relative to the surface 310 is exceptionally difficult with the scanner 100 because the movement of the scanner 100 relative to the surface 310 is governed by manual movement provided by a user. The relative movement between the scanner 100 and the surface 310 is typically erratic due to the human involvement. The scanner 100, thus, must have a means to determine its position relative to the surface 310 as the scan line portions 362 are being generated with the erratic movement of the scanner 100 relative to the surface 310. When the position information is determined, the image data representing the individual scan line portions 362 may be electronically tagged with the positions from which they were generated. The scanner 100 may then replicate the image of the surface 310 by known processing techniques.

The scanner 100 disclosed herein determines its position relative to a surface by measuring the contours of the surface from different locations as the scanner 100 is moved relative to the surface. As is described in greater detail below, the contour information is in the form of at least two substantially similar signals that are out of phase. The phase shift is directly proportional to the velocity of the scanner 100 relative to the surface. The scanner 100 uses the phase shift between the signals to determine the velocity and, thus, the position of the scanner 100 relative to the surface.

In summary, the scanner 100 uses the position sensors 200 attached to the scanner 100 to measure the contours of a surface from two fixed locations as the scanner 100 is moved relative to the surface. Each position sensor 200 measures the depth of the surface relative to the position sensor 200 from the two measuring locations. Accordingly, each position sensor 200 generates two contour profiles of the surface, which are output to a processor 140. The contour profiles generated at the measuring locations will be virtually identical, except that they will be out of phase, meaning that one contour profile lags the other in time. This time lag is used by the processor to determine the velocity, direction of movement, acceleration, and position of the position sensors 200 relative to the surface.

Figure 2:
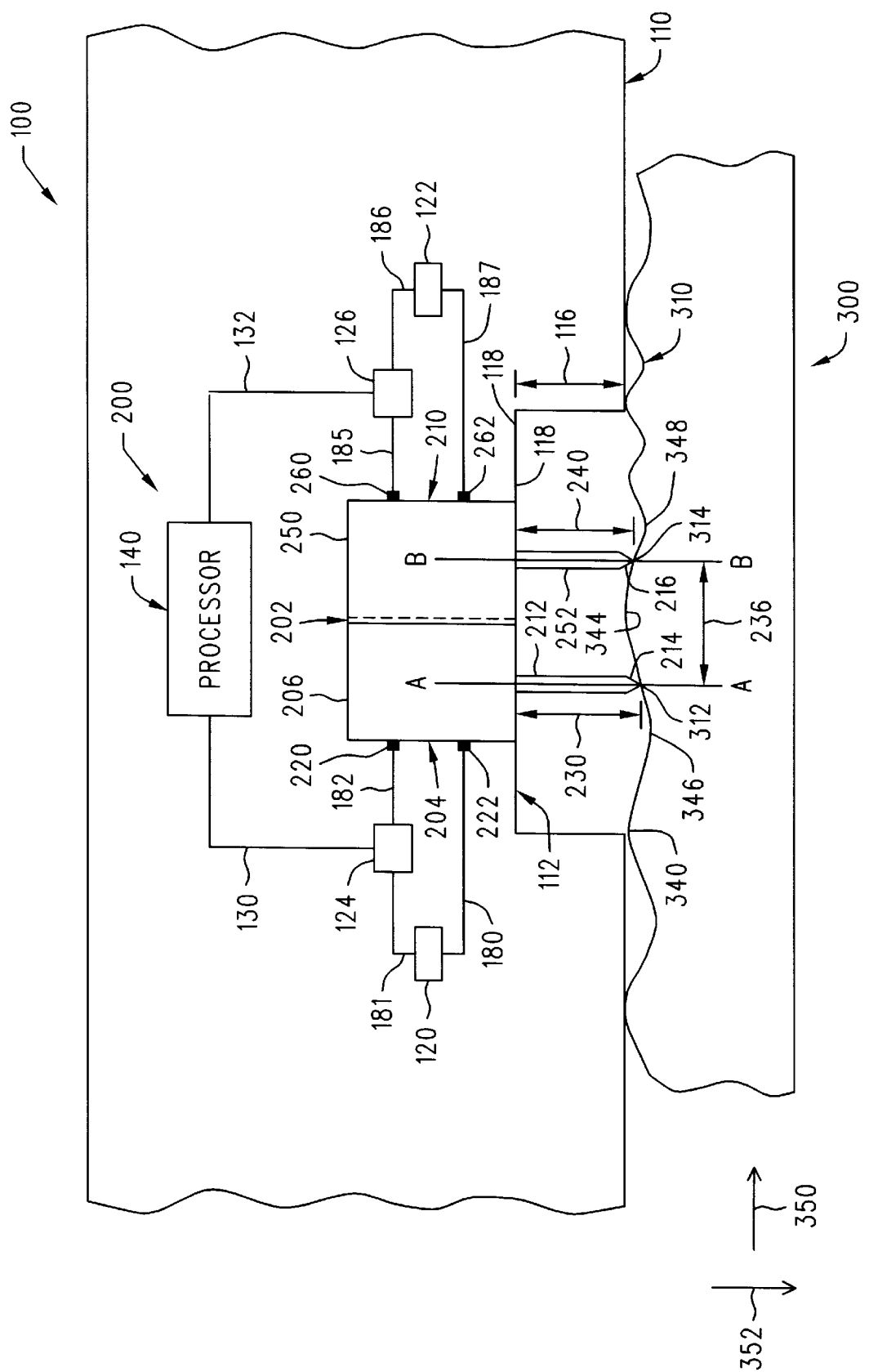
FIG. 2 is a side, cut away view of the scanner of FIG. 1 illustrating a position sensor associated with a document.
Figure 3:
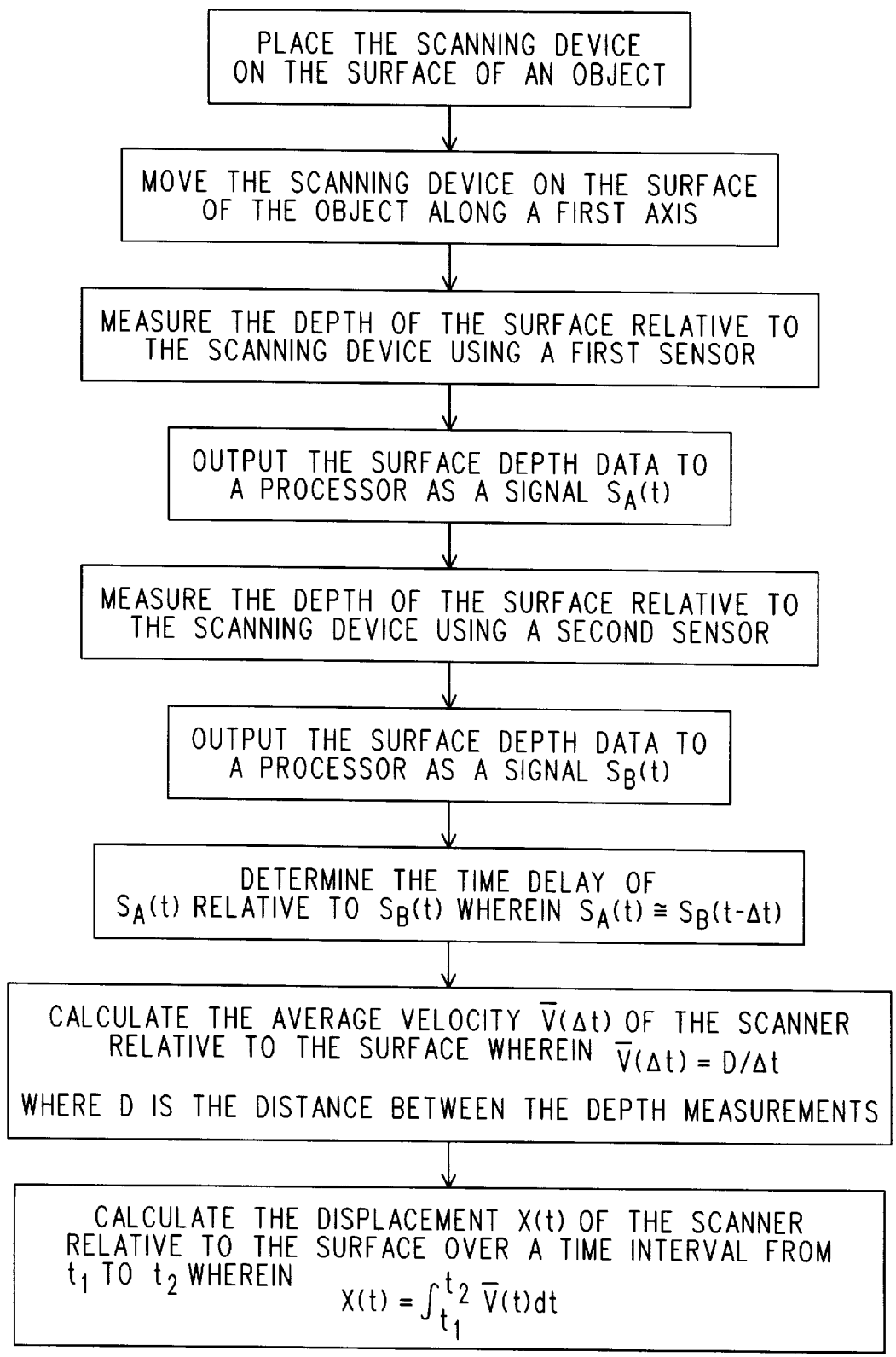
FIG. 3 is a flow chart illustrating a method of determining the position and velocity of the position sensor relative to the document of FIG. 1.

FIG. 2 illustrates a side view of the scanner 100 with a single position sensor 200 incorporated within the scanner 100. The position sensor 200 may have two depth measurement devices or sensors, a first sensor 210 and a second sensor 204. The depth measurement devices and sensors are sometimes referred to as profilometers. These sensors 210, 204 may serve to measure the contours of the surface 310 of the page 300, as the object is moved relative to the sensors 210, 204. Each sensor 210, 204 may generate a time dependent signal, wherein the values of the signals at a particular time are proportional to the depth being measured by the sensors 210, 204 at that time. The signals will be substantially similar, except that they will be out of phase wherein the phase shift between the signals is dependent on the distance 236 between the sensors 210, 204 and the relative velocity between the sensors 210, 204 and the object. The distance 236 between the sensors 210, 204 is constant, thus, the phase shift is dependent on the single variable of relative velocity between the sensors 210, 214 and the surface 310. A processor 140, may analyze the signals to determine the phase shift and, accordingly, may determine the velocity and direction of movement of the sensors 210, 204 relative to the surface 310. The velocity may be integrated over a time interval to yield the displacement of the sensors 210, 204 relative to the surface 310 during the time interval. The velocity may also be differentiated to yield the acceleration of the sensors 210, 204 relative to the surface 310.

Having summarily described the scanner 100 and the position sensor 200, they will now be described in further detail. Referring to FIG. 2, the position sensor 200 described herein is illustrated as being used in the scanner 100, which is depicted herein as being a hand-held type scanner. For illustration purposes, FIG. 2 only illustrates a partial cut away side view of the scanner 100. The scanner 100 is illustrated in FIG. 2 scanning the surface 310 of the page 300 wherein the page 300 is a sheet of paper. It is to be understood, however, that the scanner 100 may be adapted to scan other objects. It is also to be understood that the position sensor 200 may be used in devices other than the scanner 100 to determine the position of the other devices relative to a surface.

During the scanning process, the scanner 100 contacts the surface 310. The surface of a sheet of paper, such as the surface 310, is inherently contoured with sporadic crests and troughs. One cause of these sporadic crests and troughs is due to the pulp material used in the manufacture of paper products. Two examples of crests are illustrated in FIG. 2 as a first crest 340 and a second crest 344. Two examples of troughs are illustrated in FIG. 2 as a first trough 346 and a second trough 348. As will be described below, the distinct features of the surface 310 created by the crests and troughs are used by the position sensor 200 to determine the velocity, direction of movement, and position of the scanner 100 relative to the surface 310 of the page 300.

The scanner 100 may have a glide portion 110 and a mounting portion 112. The glide portion 110 may serve to contact the surface 310 of the page 300. The glide portion 110 may, as an example, be a portion of the scanner housing and may be a low friction surface. The mounting portion 112 may be recessed into the scanner 100 a depth 116 from the glide portion 110. The mounting portion 112 may have a top surface 118 that faces the interior of the scanner 100. A sensor unit 202 may be attached to the top surface 118 of the mounting portion 112. As will be described below, the sensor unit 202 is a component of the position sensor 200 that is used to measure the depth of the surface 310 of the page 300 as the scanner 100 is moved relative to the surface 310.

The sensor unit 202 may be a single component having a first sensor 210 and a second sensor 204. The first sensor 210 may have a first transducer 250 associated with a first stylus 252. The first stylus 252 may extend through the mounting portion 112 of the scanner 100 a minimal length of the depth 116 between the glide portion 110 and the mounting portion 112. This length of the first stylus 252 allows the first stylus 252 to contact the surface 310 of the page 300. A reference line BB is illustrated in FIG. 1 as being centrally located on the first stylus 252. The first transducer 250 may have a first electric terminal 260 and a second electric terminal 262. The terminals 260, 262 may be electrically connected to a resistive load, not shown, located within the first transducer 250 that varies as the position of the first stylus 252 varies relative to the first transducer 250.

The second sensor 204 may be substantially similar to the first sensor 210 and may have a second transducer 206, a second stylus 212, a first terminal 220, and a second terminal 222. A reference line AA is illustrated in FIG. 2 as being centrally located on the second stylus 212. The second stylus 212 may be separated from the first stylus 252 by a distance 236, e.g., 0.1 millimeters. Specifically, the reference line AA may be separated from the reference line BB by the distance 236. An example of a stylus associated with a transducer is illustrated in the U.S. Pat. No. 5,818,605 of Crewe et al. for METHOD AND APPARATUS FOR HIGH RESOLUTION SENSING OF ENGRAVING STYLUS MOVEMENT, which is hereby incorporated by reference for all that is disclosed therein.

The end of the first stylus 252 opposite the first transducer 250 may form a tip 216. The reference line BB in FIG. 1 may extend through the tip 216. The tip 216 may be configured to contact and move along the surface 310 in a conventional manner. In the example illustrated in FIG. 1, the stylus 252 is being used to measure the contours on the surface 310 of the page 300, wherein the contours are caused by irregularities in the surface of a sheet of paper. It has been found that having the tip 216 come to a point having a radius of approximately 0.005 millimeters is the optimal tip configuration for this application. The tip 216 is not sharp enough to cut the surface 310 of the page 300, nor is the tip 216 too blunt to fit into the troughs of the surface 310. The second stylus 212 may have a similar tip 214 wherein the reference line AA in FIG. 1 extends through the tip 214.

The position sensor 200 may further comprise a processor 140, a first detector 126, a second detector 124, a first power supply 122, and a second power supply 120. The first power supply 122 and the second power supply 120 have been separated into individual units for illustration purposes, however, it is to be understood that they may be a single unit. The power supplies 120,122 may, as an example, be DC voltage sources as are known in the art. The detectors 124, 126 may, as an example, be ammeters as are known in the art.

The first power supply 122 may be electrically connected to the second terminal 262 of the first transducer 250 by a line 187. The first power supply 122 may also be electrically connected to the first detector 126 by a line 186. The first detector 126 may be electrically connected to the first terminal 260 of the first transducer 250 by a line 185, which completes a circuit through the first transducer 250, the first detector 126, and the first power supply 122. The first detector 126 may output data representative of the current flow through the terminals 260, 262 to the processor 140 via a data line 132.

The second detector 124 and the second power supply 120 may be associated with the second transducer 206 and the processor 140 in a similar manner as the first power supply 122 and the first detector 126 are associated with the first transducer 250 and the processor 140. The second power supply 120 may be electrically connected to the second terminal 222 of the second transducer 206 by a line 180. The second power supply 120 may also be connected to the second detector 124 by a line 181. The second detector 124 may be electrically connected to the first terminal 220 of the second transducer 206 by a line 182. The second detector 124 may output data representative of the current flow through the terminals 220, 222 to the processor 140 via a data line 130.

Having described the structure of the position sensor 200 integrated into the scanner 100, the operation of the position sensor 200 will now be described. The following description is summarized by the flow chart of FIG. 3. In summary, the sensors 204 and 210 generate data representative of the depths of their respective styli 212 and 252 relative to the surface 310 of the page 300. The depth data is in the form of two substantially similar analog signals that are out of phase. The processor 140 receives these two depth signals and determines the phase shift between the signals, which is translated to a time delay. This time delay represents the time difference between the two depth signals. The processor 140 divides the distance 236 between the styli 212 and 252 by this time difference to yield the average velocity of the scanner 100 relative to the surface 310 of the page 300 over the period of the time delay. The velocity may be integrated over a time interval to yield the displacement of the scanner 100 relative to the page 300 during the time interval.

Having summarily described the operation of the position sensor 200, it will now be described in detail operating within the scanner 100. The operation of the scanner 100 incorporating the position sensor 200 will be described herein as moving in the direction 350 relative to the page 300. The scanner 100 is placed onto the surface 310 of the page 300 so that the glide portion 110 contacts the surface 310. A slight force in a direction 352 may act on the styli 212, 252 to force them against the surface 310. The styli 212 and 250 are able to extend far enough beyond the glide portion 110 so they may contact the troughs in the surface 310 of the page 300. It is not critical that the styli 212, 252 extend far enough to contact every trough, however, the accuracy of the position sensor 200 diminishes proportionally with the number of troughs that the styli 212, 252 cannot contact. This diminished accuracy is due to the transducers 206, 250 outputting inaccurate data regarding the depths of these troughs that cannot be contacted.

In the example illustrated in FIG. 2, the first stylus 252 is extended a distance 240 to intersect the surface 310 of the page 300 at a point 314 and the second stylus 212 is extended a distance 230 to intersect the surface 310 at a point 312. The first stylus 252 has passed over the crest 340, through the trough 346, over the crest 344, and is proceeding toward the trough 348. Accordingly, the first stylus 252 is in the process of extending from the first transducer 250 toward the surface 310 to contact the trough 348. The second stylus 212 has passed over the crest 340, through the trough 346, and is proceeding toward the crest 344. Accordingly, the second stylus 212 is in the process of retracting from the surface 310 toward the second transducer 206 to contact the crest 344. The positions of the styli 212, 252 relative to the transducers 206, 250 will be used by the position sensor 200 as described below to determine the velocity and position of the scanner 100 relative to the surface 310 of the page 300.

As the styli 212, 252 follow the contours of the surface 310, the transducers 206, 250 measure the positions of the styli 212, 252 relative to the transducers 206, 250. As previously described, the transducers 206, 250 described herein have resistive loads that vary proportionally relative to the positions of the styli 212, 252 relative to the transducers 206, 250. Referring to the first transducer 250, the first power supply 122 provides a potential across the terminals 260 and 262 via the lines 185, 186, and 187. The first detector 126 is depicted herein as being an ammeter, accordingly, no significant voltage drops across it. The current passing through the first transducer 250 via the terminals 260, 262 is dependent on the value of the resistive load located within the first transducer 250, which is dependent on the position of the first stylus 252 relative to the first transducer 250. The first detector 126 measures the current flow through the first transducer 250 and outputs data representative of this current flow to the processor 140 via the data line 132. Accordingly, the depth of the surface 310 relative to the first transducer 250 is measured by the amount of current that flows through the first transducer 250.

Referring to the second transducer 206, the second power supply 120 provides a potential across the terminals 220 and 222 via the lines 180, 181, 182. The second detector 124 is illustrated herein as being an ammeter, accordingly, no significant voltage drops across it. The current passing through the second transducer 206 via the terminals 220, 222 is dependent on the value of the resistive load located within the second transducer 206, which is dependent on the location of the second stylus 212 relative to the second transducer 206. The second detector 124 measures the current flow through the second transducer 206 and outputs data representative of this current to the processor 140 via the data line 130. Accordingly, the depth of the surface 310 relative to the first transducer 250 is measured by the amount of current that flows through the first transducer 250.

The data output to the processor 140 from the detectors 124, 126 may be in the form of analog signals or digital representations of analog signals. As will be described in greater detail below, the amplitudes of the signals output by the detectors 124,126 are virtually identical, however, the signal output by the second detector 124 is phase shifted from the signal output by the first detector 126. Because the scanner 100 is moving in the direction 350 relative to the surface 310, the output from the first detector 126 leads the output from the second detector 124 because the first stylus 252 leads the second stylus 212 along the contours of the surface 310 of the page 300. This phase shift represents a time difference between the signals wherein the signal output by the second detector 124 is delayed relative to the signal output by the first detector 126. If the scanner 100 were to move a direction opposite the direction 350, the signal output by the second detector 124 would lead the signal output by the first detector 126.

Figure 4:
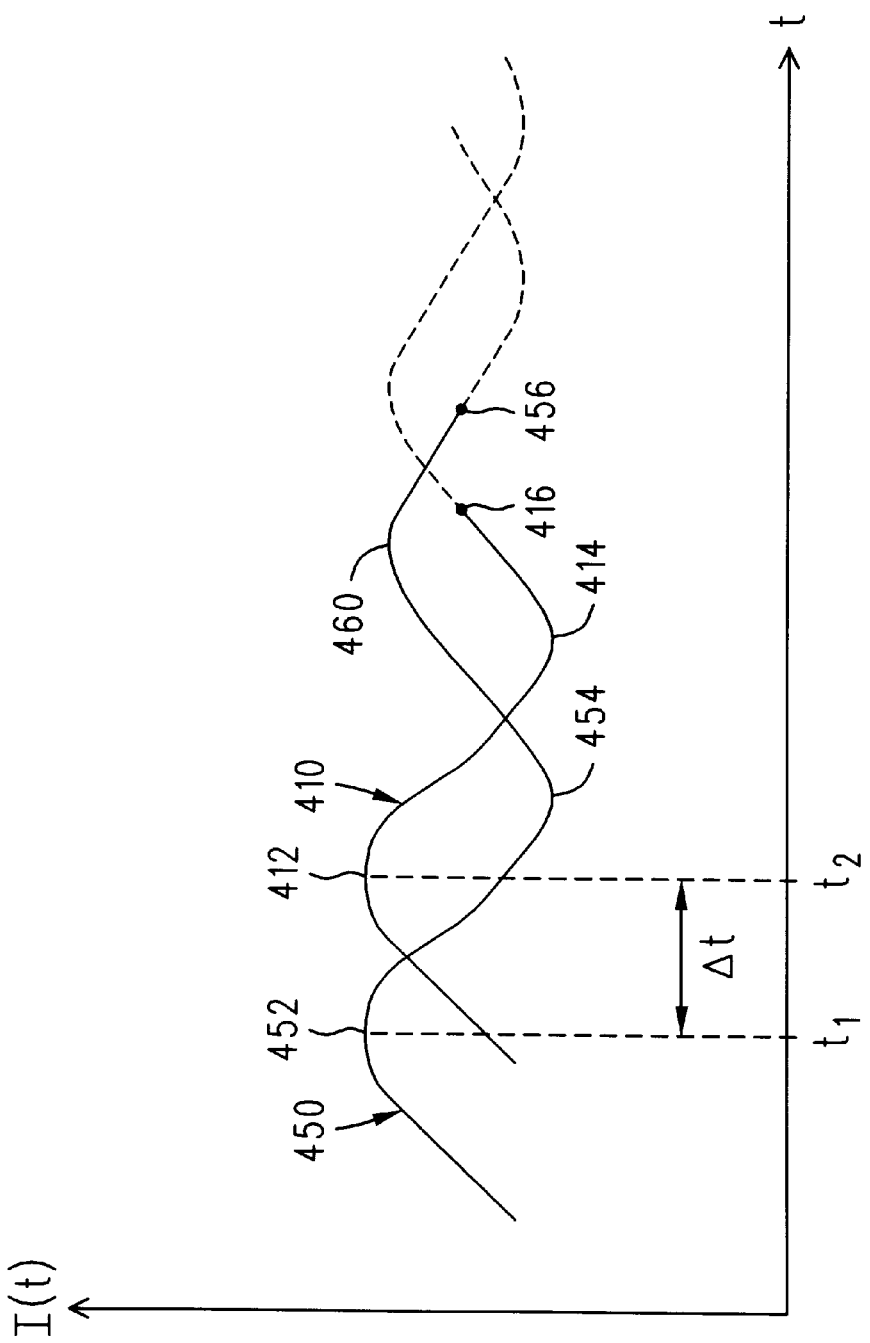
FIG. 4 is a graph depicting measurements of the position sensor of FIG. 1.

FIG. 4 is a graph that represents the current flow through the transducers 206, 250, FIG. 2, as a function of time. A waveform 450 is representative of the current flow through the first transducer 250. The solid section of the waveform 450 represents the contour of the surface 310, FIG. 2, that the first stylus 252 has passed over. The dashed section of the waveform 450 represents the contour of the surface 310, FIG. 2, that the first stylus 252 will pass over if the scanner 100 continues to move in the direction 350 relative to the surface 310. A junction 456 between the solid section and the dashed section represents the present position of the first stylus 252, FIG. 2, at the point 314 on the surface 310. The waveform 450 has a crest 452 that is representative of the crest 340, FIG. 2, on the surface 310 of the page 300. The waveform 450 has a trough 454 that is representative of the trough 346, FIG. 2, on the surface 310. The waveform 450 also has another crest 460 that is representative of the crest 344, FIG. 2, on the surface 310.

FIG. 4 illustrates a waveform 410 that represents the current flow through the second transducer 206 as a function of time. The solid section of the waveform 410 represents the contours of the surface 310, FIG. 2, on the page 300 that the second stylus contacted prior to contacting the point 312. The dashed section of the waveform 410 represents the contour of the surface 310, FIG. 2, that will be measured by the second transducer 206 if the scanner 100 continues to move in the direction 350. A point 416 at the junction of the solid section and the dashed section represents the second stylus 212, FIG. 2, located at the point 312 on the surface 310. The waveform 410 has a crest 412, which is representative of the current flow through the second transducer 206, FIG. 2, as the second stylus 212 passed over the crest 340 on the surface 310 of the page 300. The waveform 410 has a trough 414, which is representative of the current flow through the second transducer 206, FIG. 2, as the second stylus 212 passed through the trough 346.

The amplitude of the waveform 410 is virtually identical to the amplitude of the waveform 450, however, they are out of phase. This phase shift represents a time delay in the time domain plot of FIG. 4 wherein the waveform 410 lags the waveform 450. This lag is due to the second stylus 212, FIG. 2, lagging the first stylus 252 as they measure the contours of the surface 310. The crest 412 on the waveform 410 and the crest 452 on the waveform 450 will be used in this example as references to illustrate the time delay. The crests 412 and 452 are representative of the crest 340 on the surface 310, FIG. 2. The crest 452 was measured at a time $t_1$ and the crest 412 was measured at a time $t_2$. The time difference between $t_1$ and $t_2$ is $\Delta t$. The time difference $\Delta t$ may be measured by conventional methods. An example of using cross correlation to measure $\Delta t$ is described below. The average velocity of the scanner 100 relative to the surface 310 of the page 300 between the time interval $t_1$ and $t_2$ may be measured by applying the formula:

$$\overline{V}(\Delta t) = \frac{D}{\Delta t}$$

where:
V($\Delta t$) is the average velocity of the scanner 100, FIG. 2, relative to the surface 310 over the time interval $\Delta t$;
D is the distance 236 between the first stylus 252 and the second stylus 212, FIG. 2; and
$\Delta t$ is the time difference between $t_1$ and $t_2$.

The processor 140, FIG. 2, may continually determine the average velocity of the scanner 100 relative to the surface 310 of the page 300. These average velocities calculated over time yield the velocity of the scanner 100 relative to the surface 310 as a function of time. The velocity as a function of time may then be integrated over a time interval to yield the displacement of the scanner 100 relative to the surface 310 over the time interval. Instantaneous velocity and displacement at a selected point may also be readily calculated from the data by known techniques. Likewise, the acceleration may also be obtained by calculating the first derivative of the velocity.

Referring briefly to FIG. 2, the direction of movement of the scanner 100 relative to the surface 310 may be determined by analyzing the phase shift between the output of the first detector 126 and the second detector 124. If the output of the first detector 126 leads the output of the second detector 124, then the scanner 100 is moving in the direction 350 relative to the surface 310. If the output of the first detector 126 lags the output of the second detector 124, then the scanner is moving opposite the direction 350 relative to the surface 310.

Referring again to FIG. 4, many different methods of determining the phase shift and the associated time delay between the waveforms 410, 450 are available. One method is by sampling the waveforms 410, 450, converting them to digital signals, and processing the digital signals by the processor 140, FIG. 2. The processor 140 may, as an example, apply a cross correlation function to the digital signals to determine the time difference between the waveforms 410, 450. In the example illustrated in FIG. 4, the waveforms 410, 450 may be sampled at a period $t_s$. The sampling frequency $f_S$ is, accordingly, equal to $1/t_s$. The following cross correlation function may be applied to the waveforms 410, 450 and solved for the cross correlation coefficient C:

$$C_{m=0}^{m=n} = \sum_{t=0}^{t=t_n-mt_s} (S_B(t-mt_s) - S_A(t))^2$$

where:

C is the cross correlation coefficient;
m is the sample count;
n is the maximum sample count;
$S_A$ is the waveform 450; and
$S_B$ is the waveform 410.

At this point, the value of $m_{min}$ may be calculated, which is the value of m that yields the minimum value for C. It follows from the cross correlation equation that the time delay ($\Delta t$ or $t_2-t_1$) is equal to $m_{min}t_s$. When the time delay has been calculated, the average velocity between $t_2$ and $t_1$ may be calculated as follows:

$$\overline{V} = \frac{D}{m_{min}t_s}$$

where:

D is the distance 236, FIG. 2;
$m_{min}$ yields the minimal value of C; and
$t_s$ is the sampling period.

Referring again to FIG. 2, the distance the scanner 100 has traveled relative to the surface 310 over a specified time interval may be calculated by integrating the velocity of the scanner 100 relative to the surface 310 over the specified time interval. Likewise, the acceleration of the scanner 100 relative to the surface may be calculated by calculating the derivative of the velocity.

Having described the formulas pertaining to the position sensor 200, an example of using the formulas will now be described. The variable, n, is chosen depending on the application for which the position sensor 200 is anticipated to be used. For example, applications that require a high acceleration or high velocity require that the variable, n, be minimized in order to minimize errors. In the case of a hand-held scanner, the maximum acceleration of the scanner is typically approximately 96.5 inches/seconds². If the maximum anticipated velocity of the scanner is 12 inches/second and the allowable error is 1/300 of an inches over the period $nt_s$, then it has been found that a sampling period, $t_s$, of 0.1 milliseconds and a value of n equal to 10 will be sufficient to meet the allowable error.

Figure 5:
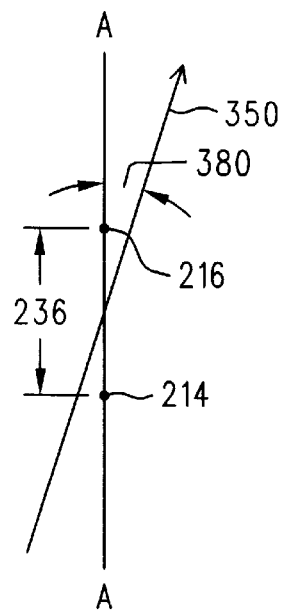
FIG. 5 is a schematic illustration depicting the movement of the scanner of FIG. 1 relative to the location of the position sensor.

The position sensor 200 described herein functions to determine velocity and displacement of an object, e.g., the scanner 100, along a single axis. Corrections may have to be made to the previously calculated velocity and displacement of the scanner, as described below, if the movement of the scanner 100 strays from the axis. FIG. 5 is a schematic illustration depicting the direction 350 of the scanner, not shown, relative to the tips 214, 216 of the styli, not shown. The tips 214, 216 are located on an axis depicted by the reference line AA in FIG. 5. Under ideal conditions, the direction 350 is parallel to the reference line AA and no correction is required to be made to the calculated velocity and displacement.

When the direction 350 is not parallel to the reference line AA, as illustrated in FIG. 5, corrections to the previously calculated position and velocity of the scanner 100 may have to be made. These corrections may have to be made because the previously calculated velocity is based on the distance 236, FIG. 2, between the tips 214, 216 being measured on the same axis as the movement 350 of the scanning device 100 relative to the surface 310. In FIG. 5, the reference line AA is at an angle θ, depicted numerically as 380, from the direction 350. As the angle (θ) 380 increases, the error in calculating the velocity increases as a function of the cosine θ. For example, if the angle 380 is equal to 15 degrees, the actual velocity of the scanner along the direction 350 will be equal to 97% (100×cos(15)) of the previously calculated velocity.

It is possible to compensate for the above-described error during manufacturing. For example, referring to FIGS. 2 and 5, the scanner 100 or other device to which the position sensor 200 is attached may be moved on a surface in the direction 350 over a predetermined distance while the position sensor 200 determines the distance traveled. The distance measured by the position sensor 200 may then be compared to the predetermined distance to yield the error in the position sensor 200. A scaling factor may then be input into the processor 140 which will scale measured distance to correct for the above-described positioning errors. The distances measured by the position sensor 200 may then be multiplied by the scaling factor to yield the actual distance traveled by the position sensor 200.

Figure 6:
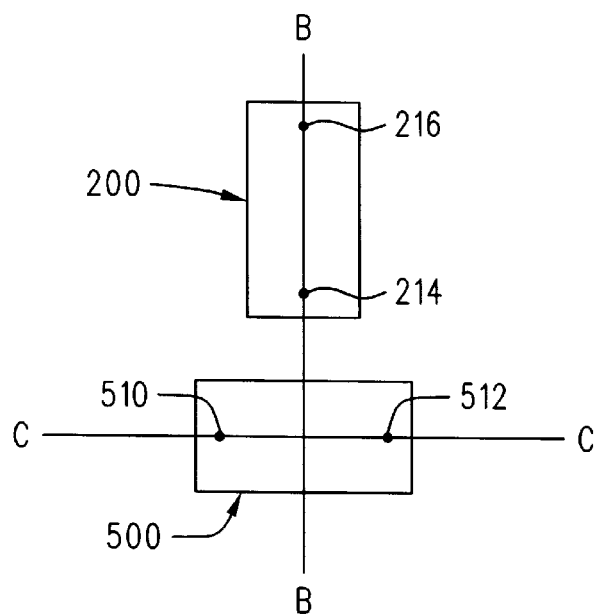
FIG. 6 is a schematic illustration depicting the positions of a plurality of position sensors that may be attached to an object.

Embodiments for the use of the position sensor 200 may exist where the position and velocity of an object may be required along a plurality of axes. FIG. 6 illustrates a top, cut away view of a scanner having two position sensors 200 and 500 that are used to determine the position and velocity of the scanner along a reference line BB and a reference line CC. The positions sensors 200, 500 of FIG. 6 function in the same manner as the position sensor 200 of FIG. 2. The position sensor 200 is used to determine the velocity along the reference line BB and the position sensor 500 is used to determine the velocity along the reference line CC. The position sensor 200 has two styli tips 214 and 216 located along the reference line BB. The position sensor 500 has two styli tips 510 and 512 located along the reference line CC. Accordingly, the position sensor 200 is used to determine the velocity and position along the reference line BB and the position sensor 500 is used to determine the velocity along the reference line CC. It is to be understood that any number of position sensors may be affixed to an object to determine the velocity and position of the object in any number of directions.

Referring to FIG. 1, several position sensors 200 may be attached to the scanner 100 to determine the rotational motion of the scanner 100. In FIG. 1, the scanner 100 has two identical position sensors 200 attached thereto. The position sensors 200 are positioned along the reference lines DD and EE wherein the reference lines are parallel. If the scanner rotates in a direction 354, the position sensors 200 will yield different velocities, which are indicative of the scanner 100 following a rotational path. The scanner 100 may readily determine the amount of rotation and direction of rotation based on the difference in velocities of the position sensors 200.

Referring to FIG. 2, the distance 236 between the tips 214, 216 may have to meet the Nyquist criteria. For example, if the contours of the surface 310 are repetitious wherein each repetition has a predetermined distance, the distance 236 will have to be less than half the predetermined distance. Otherwise, aliasing will occur, which will likely cause the time difference between the signal output by the first detector 126 and the signal output by the second detector 124 as measured by the processor 140 being less than the actual time difference. This, in turn, will cause the processor to indicate that the scanner 100 is moving at a greater velocity relative to the surface 310 than it is actually moving.

For example, in the case where the position sensor 200 is used in a scanner 100 to image text on paper, the paper may, as a further example, have two to four crests per millimeter. In this case, it has been found that having the distance 236 equal to 0.1 millimeters will allow the position sensor 200 to accurately determine the profile of the surface without the processor 140 encountering aliasing problems.

Other embodiments of the position sensor 200 may be applicable to various applications. For example, referring again to FIG. 2, the position sensors 204, 210 have been described herein as being styli 212, 252 associated with transducers 206, 250. Any suitable depth measuring mechanism (often referred to as a profilometer) may be used for the position sensors 204, 210. For example, the position sensors 204, 210 may be optical profilometers as are known in the art.

In another embodiment, the position sensor 200 may use a plurality of depth measurement devices mounted along an axis. Increasing the number of depth measurement devices used by the position sensor 200 decreases the error that may be associated with the depth measurements.

The position sensor 200 described above has been incorporated into the scanner 100. It is to be understood, however, that the position sensor 200 may be incorporated into other devices. For example, the position sensor may be used in a printer having a print carriage or the like to determine the velocity of the print carriage relative to the paper being printed upon.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A velocity sensing device for determining the velocity of an object relative to a first axis wherein said first axis is located on a surface, said velocity sensing device comprising:
   a first profilometer attachable to said object;
   a second profilometer attachable to said object at a predetermined distance from said first profilometer, wherein said first profilometer and said second profilometer are located along a second axis and wherein said first axis is substantially parallel to said second axis; and
   a processor adapted to:
      receive a first signal from said first profilometer and a second signal from said second profilometer wherein said first signal is time shifted relative to said second signal;
      determine said time shift between said first signal and said second signal; and
      divide said predetermined distance between said first profilometer and said second profilometer by said time shift to determine the velocity of said object relative to said surface.

2. The velocity sensing device of claim 1 wherein said processor is further adapted to integrate said velocity over a time interval to yield the displacement between said object and said surface during said time interval.

3. The velocity sensing device of claim 1 wherein said predetermined distance between said first profilometer and said second profilometer is about 0.1 millimeters.

4. The velocity sensing device of claim 1 wherein at least one of said profilometers comprises a stylus operationally associated with a transducer.

5. The velocity sensing device of claim 1 wherein at least one of said profilometers comprises an optical profilometer.

6. The velocity sensing device of claim 1 comprising more than two profilometers located along said second axis.

7. A position sensing device for determining the velocity of an object relative to a first axis wherein said first axis is located on a surface, said velocity sensing device comprising:
   a first transducer operationally associated with a first stylus attachable to said object;
   a second transducer operationally associated with a second stylus attachable to said object wherein said first stylus is located a predetermined distance from said second stylus, wherein said first stylus and said second stylus are located along a second axis, and wherein said first axis is substantially parallel to said second axis; and
   a processor adapted to:
      receive a first signal from said first transducer and a second signal from said second transducer wherein said first signal is time shifted relative to said second signal;
      determine said time shift between said first signal and said second signal; and
      divide said predetermined distance between said first stylus and said second stylus by said time shift to determine the velocity of said object relative to said surface.

8. The velocity sensing device of claim 7 wherein said first stylus is an elongated member having a first portion and a second portion, wherein said first portion is operationally associated with said first transducer and wherein said second portion forms a tip.

9. The velocity sensing device of claim 8 wherein said tip has a radius of about 0.005 millimeters.

10. The velocity sensing device of claim 7 wherein said second stylus is an elongated member having a first position and a second portion, wherein said first portion is operationally associated with said second transducer and wherein said second portion forms a tip.

11. The velocity sensing device of claim 10 wherein said tip has a radius of about 0.005 millimeters.

12. The velocity sensing device of claim 7 wherein at least one of said transducers comprises a variable load wherein the value of said variable load is proportional to the location of the stylus associated with said at least one of said transducers relative to said at least one of said transducers.

13. The velocity sensing device of claim 7, wherein said processor is further adapted to integrate said velocity over a time interval to yield the displacement between said object and said surface during said time interval.

14. The velocity sensing device of claim 7 wherein said predetermined distance between said first stylus and said second stylus is about 0.1 millimeters.

15. The velocity sensing device of claim 7 wherein said object has more than two transducers operationally associated with styli located along said second axis.

16. A velocity sensing device for determining the velocity of an object relative to a first axis wherein said first axis is located on a surface, said velocity sensing device comprising:
   a first optical profilometer attachable to said object;
   a second optical profilometer attachable to said object wherein said first optical profilometer is located a predetermined distance from said second optical profilometer, wherein said first optical profilometer and said second optical profilometer are located along a second axis, and wherein said first axis is substantially parallel to said second axis; and a processor adapted to:
receive a first signal from said first optical profilometer and a second signal from said second optical profilometer wherein said first signal is time shifted relative to said second signal;
determine said time shift between said first signal and said second signal; and
divide said predetermined distance between said first optical profilometer and said second optical profilometer by said time shift to determine the velocity of said object relative to said surface.

17. The velocity sensing device of claim 16 wherein said processor is further adapted to integrate said velocity over a time interval to yield the displacement between said object and said surface during said time interval.

18. A method of determining the velocity of an object relative to a first axis on a surface, said method comprising:
providing a first depth measurement device affixed to said object;
providing a second depth measurement device affixed to said object, said second depth measurement device being spaced a predetermined distance along a second axis from said first depth measurement device, said first axis being substantially parallel to said second axis;
causing relative movement between said object and said surface along said first axis;
measuring the depth of said surface with said first depth measurement device and said second depth measurement device;
performing an analysis on the depth of said surface measured by said first depth measurement device and said second depth measurement device to determine the velocity of said object relative to said surface.

19. The method of claim 18 further comprising performing an analysis on said velocity to determine the position of said object relative to said surface.

20. The method of claim 18 further comprising performing an analysis on said velocity to determine the displacement of said object relative to said surface during a time interval.

* * * * *